Dec. 26, 1967  H. RAPPARLIE ET AL  3,360,260
CONVEYOR DEVICE
Filed Aug. 20, 1965  4 Sheets-Sheet 1

Hans Rapparlie
Rudolf Mielert
Eberhard Ernst
Inventors

By Spencer & Kaye
Attorneys

Dec. 26, 1967   H. RAPPARLIE ET AL   3,360,260
CONVEYOR DEVICE
Filed Aug. 20, 1965   4 Sheets-Sheet 3

Hans Rapparlie
Rudolf Mielert
Eberhard Ernst
Inventors

By: *Spencer & Kaye*
Attorneys

Dec. 26, 1967   H. RAPPARLIE ET AL   3,360,260
CONVEYOR DEVICE

Filed Aug. 20, 1965   4 Sheets-Sheet 4

Hans Rapparlie
Rudolf Mielert
Eberhard Ernst
Inventors

By Spencer & Kaye
Attorneys

3,360,260
CONVEYOR DEVICE
Hans Rapparlie, Rudolf Mielert, and Eberhard Ernst, Constance, Germany, assignors to Telefunken Patentverwertungsgesellschaft mbH., Ulm (Danube), Germany
Filed Aug. 20, 1965, Ser. No. 481,296
Claims priority, application Germany, Aug. 22, 1964,
T 26,868
15 Claims. (Cl. 271—45)

The present invention relates generally to the mechanized processing of flat items such as items of mail, and, more particularly to a device which renders it possible to establish as uniform a conveying flow as possible, with a uniform direction of overlap, from random items of this kind which arrive sometimes in piles. The uniform direction of overlap is particularly important if the items are to be supplied to a stacker or intermediate stacker, because items which are wrongly overlapped frequently cause disturbances.

In U.S. Patent No. 2,941,654, a device is described which is adapted to convert an irregular conveying flow of items of mail into a uniform conveying stream in which the majority of the items follow one another spaced apart and only a few are still overlapped. The device comprises a horizontal bottom conveyor belt and a group of vertical conveyor belts at each side of the conveying channel. One of the group of vertical conveyor belts, including a suction conveyor belt, is driven in the conveying direction and the other, at a slower speed, in the opposite direction. In such a device, however, it may happen, under unfavorable circumstances, that items of mail are pushed back to the entrance of the device by the belt running counter to the direction of conveying, and disturbances and damage may then occur at the entrance. Nor is a uniform direction of overlap ensured with certainty. Moreover, the use of a horizontal bottom belt is absolutely essential.

It has further been proposed, in order to make the conveying more even, to provide a first roller which is driven in the conveying direction and which engages laterally in the conveying channel, and a second roller which is guided parallel with the first roller and yieldingly pressed against the first from the other side of the conveying channel, and to provide means for braking the rotary movement of the second roller down to a finite residual speed if it yields outwards to a specific extent under the influence of the items travelling through. Disturbances such as those mentioned above can no longer occur in this case. The separating action of such a device is in many cases not sufficient, however, to achieve the establishment of as sufficiently uniform a conveying flow as possible with a uniform direction of overlap.

With this in mind it is an object of the present invention to provide a device which achieves a more uniform conveying flow with a more uniform direction of overlap than had been obtainable heretofore.

Another object is to provide such a device which avoids the disadvantages and imperfections of prior devices.

These objects and others ancillary thereto are accomplished in accordance with preferred embodiments of the invention wherein two conveying means opposite one another are used at each side of the conveying channel. Also, the above-mentioned disadvantages and imperfections are avoided by the combination of the features that the conveying means are situated opposite one another along a conveying path which is longer than about the length of one item of mail, and that both conveying means are driven in the conveying direction but with different conveying speeds. The ratio of the speeds of the opposite conveying means amounts preferably to between about 1:2 and 1:10.

Additional objects and advantages of the present invention will become apparent upon consideration of the following description when taken in conjunction with the accompanying drawings in which.

Figure 1:
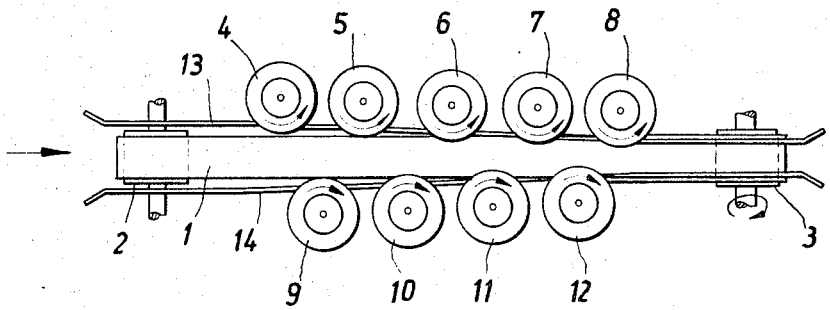
FIGURE 1 is a plan view of one embodiment of the invention wherein the conveying means are formed by a group of conveyor rollers which follow one another in the conveying direction.

With more particular reference to the drawings, the device shown in FIGURE 1 comprises a bottom conveyor belt 1 which runs over two pulleys 2 and 3, of which the latter is driven in the direction of the arrow.

At each side of the conveying channel a group of conveyor rollers 4 to 8 and 9 to 12 is mounted in such a manner that the spacing between the rollers becomes less from the inlet of the device situated at the left towards the exit. The rollers 4 to 8 are driven in the conveying direction at a speed of 2.5 meters per second for example, and the rollers 9 to 12 are likewise driven in the conveying direction at a speed of 0.5 meter per second for example. Thus the ratio of the speeds amounts to about 1:5. The driving speed of the bottom conveyor belt 1 may, for example, be 2.5 meters per second or somewhat less. Guide plates or guide fences 13 and 14 are mounted at each side of the conveying channel.

When flat items are introduced at random into this device from the left, which items wholly or partially overlap, then a mutual displacement of the items occurs during the travel between the two conveying means—here constructed in the form of groups of conveyor rollers 4 to 8 and 9 to 12—in such a manner that a substantially even conveying flow with a uniform direction of overlap of the items is present at the exit.

The space between the rollers 4 to 8 and 9 to 12 at the left and right is selected or adjusted according to the thicknes of the items to be expected. It is advisable to provide the rollers with a resilient covering, for example sponge rubber, particularly when the roller shafts are fixed.

Figure 2:
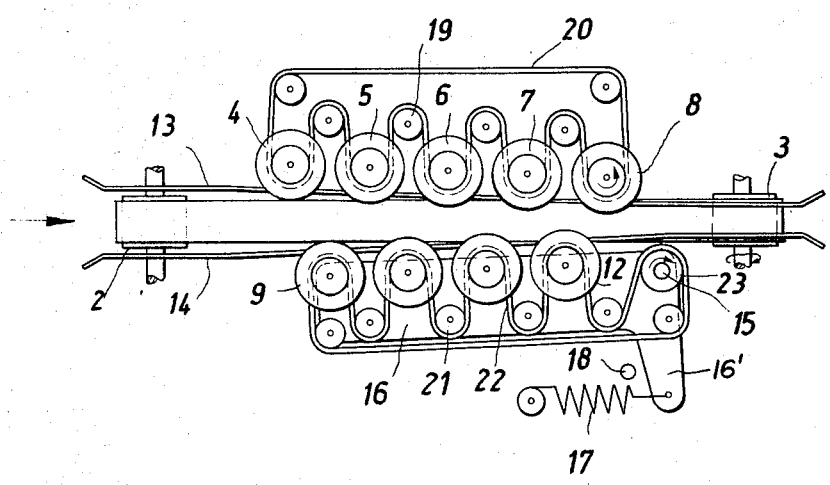
FIGURE 2 is a plan view similar to FIGURE 1 of another embodiment.

The device shown in FIGURE 2 differs from that in FIGURE 1 in that the rollers 9 to 12 are not mounted stationary but on an arm 16 which is pivotable about a shaft 15. A tension spring 17 acts on an angled extension 16' of the arm. By means of this spring the arm is pivoted so far inwardly that the extension bears against a stop 18. From this position of rest, the arm 16, with the rollers 9 to 12 carried thereby, can yield outwardly—as illustrated—if a large pile of items should enter the device.

FIGURE 2 also illustrates one arrangement for the drive of the rollers. In the left-hand group of rollers, the shaft of the conveyor roller 8 is driven and a belt 20, which is guided by guide pulleys 19, transmits this drive to the other conveyor rollers 4 to 7. The rollers 9 to 12, which are mounted on the pivotal arm 16, are driven by a belt 22, guided by guide pulleys 21, from a pulley 23, which is mounted on the driven shaft 15. The drive of the rollers in FIGURES 1 and 3 or 4 may be effected in a similar manner.

Figure 3:
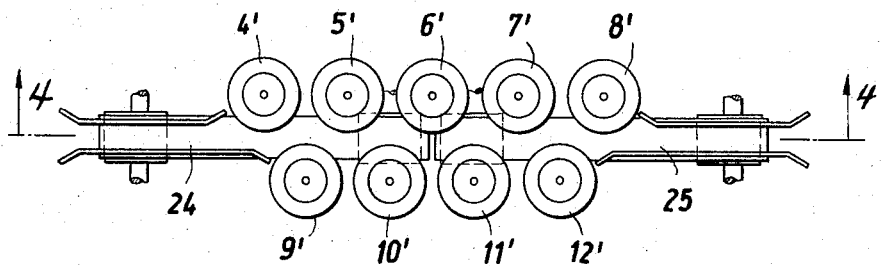
FIGURE 3 is a plan view similar to FIGURE 1 of a further embodiment.
Figure 4:
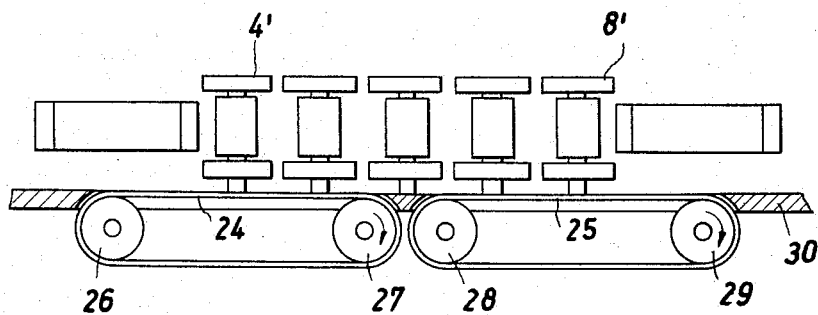
FIGURE 4 is a sectional view taken substantially along the plane defined by reference line 4—4 of FIGURE 3.

In the device shown in FIGURES 3 and 4, the rollers 4' to 8' and 9' to 12' are arranged in a similar manner to the corresponding rollers in FIGURE 1. Two bottom belts 24 and 25 are provided, however, which follow one another in the conveying direction and of which the second has a higher conveying speed than the first. These belts run over pulleys 26, 27 and 28, 29. A base plate, not illustrated in FIGURE 3, is designated 30 in FIGURE 4.

In a further development of the invention, the rollers of the two groups of conveying rollers in the device shown in FIGURE 3 are driven in such a manner that their speeds increase from the entrance to the exit of the device. For example, the faster rollers 4' to 8' may have conveying speeds of 1.0 to 2.5 meters per second, while the slower rollers 9' to 12' may have speeds of 0.2 to 0.5 meter per second. As a result of this staggering of the speeds, the action of separating the items of mail can be increased.

Figure 5:
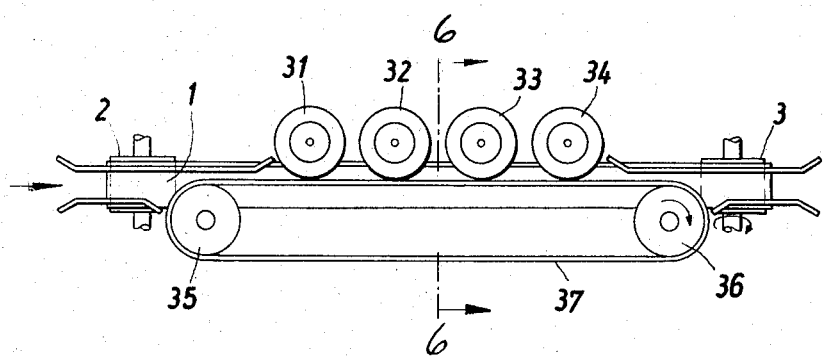
FIGURE 5 is a plan view of an embodiment having rollers and a conveyor belt.

In the example shown in FIGURE 5, one of the two conveying means mounted at the side of the conveying channel is formed by a group of conveyor rollers 31–34, and the other by an edgewise conveyor belt 37 running around two pulleys 35 and 36. The rollers run quickly and the belt slowly but a reverse speed distribution may also be used. In this device, too, the speeds of the rollers 31–34 may increase from the entrance to the exit as in FIGURE 3.

Figure 6:
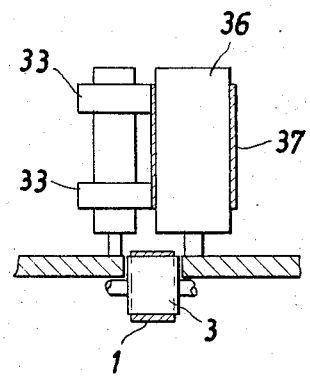
FIGURE 6 is a sectional view taken substantially along the plane defined by reference line 6—6 of FIGURE 5.

FIGURE 6 shows that the conveyor rollers each comprise, in an advantageous manner, two discs mounted one above the other. It is further an advantage if the first of the conveyor rollers 31 and preferably also the last roller 34 is offset in relation to the guide pulleys 35 and 36 for the edgewise conveyor belt 37, as illustrated.

Figure 7:
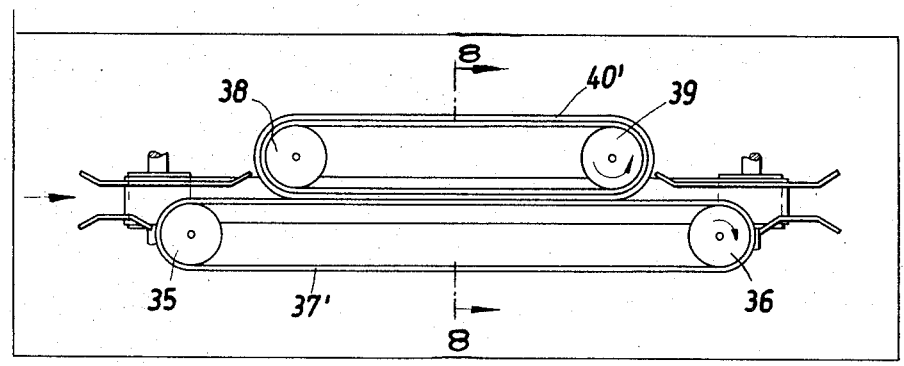
FIGURE 7 is a plan view of an embodiment having two conveyor belts.
Figure 8:
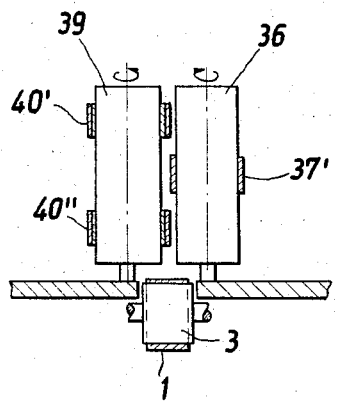
FIGURE 8 is a sectional view taken substantially along the plane defined by reference line 8—8 of FIGURE 7.

In the example illustrated in FIGURES 7 and 8, both conveying means are realized by means of edgewise conveyor belts, one of which runs quickly and the other slowly. Conveyor belts 40' and 40'', which run around two guide pulleys 38 and 39, are mounted at the left-hand side of the conveyor channel as viewed in FIGURE 8, one above the other with a space between them. The conveyor belt 37', which is at the right-hand side of the conveying channel, is mounted precisely at the height of this interspace. This formation has proved an advantage with regard to the mode of operation aimed at. Furthermore, the belts 40' and 40'' are provided with a surface having a greater entrainment capacity than the belt 37'. This greater entrainment capacity may, for example, be achieved by means of an appropriate covering. A belt provided with a nap pattern has proved particularly favorable. The belts 40' and 40'' are driven fast, the belt 37' slowly.

In general, it has proved an advantage to provide the conveying means which runs fast with a surface having a greater entrainment capacity than the one running slowly. This applies not only to the embodiments with edgewise conveyor belts but also to those with conveyor rollers.

It will be understood that the above description of the present invention is susceptible to various modifications, changes, and adaptations, and the same are intended to be comprehended within the meaning and range of equivalents of the appended claims.

What is claimed is:

1. In a device for producing a uniform conveying flow with a uniform direction of overlap from flat items which arrive at random in an edgewise conveyor trough system, such as items of mail in particular, and including two conveyor means situated opposite one another, one at each side of the conveying channel, the improvement wherein the conveying means are free of structural surface discontinuities in their direction of conveyance and are disposed opposite one another along a conveying path which is longer than about the length of one item, both conveying means being frictional conveying means, both conveying means being driven in the direction of conveying but with different conveying speeds, and the two conveying means forming a single outlet at one end of said conveying channel.

2. A conveyor device for flat articles, comprising, in combination: means in the form of a channel for defining a conveying path which includes two frictional conveying means disposed opposite one another, one at each side of the conveying channel, both of said conveying means being free of structural surface discontinuities in their direction of conveyance, both of said conveying means being free of structural surface discontinuities in their direction of conveyance said frictional conveying means being opposite one another along the conveying path which is longer than about the length of one article, both frictional conveying means being driven in the conveying direction but at different conveying speeds, and the two conveying means forming a single outlet at one end of said conveying channel.

3. A device as defined in claim 2 wherein the ratio between the speeds of the conveying means situated opposite one another is between about 1:2 and 1:10.

4. A device as defined in claim 2 wherein each of the two conveying means is formed by a group of conveying rollers following one another in the conveying direction.

5. A device as defined in claim 4 wherein the two groups of conveyor rollers are mounted for movement in relation to one another.

6. A device as defined in claim 5 wherein said conveying means further includes a pivotal arm on which one of the two groups of conveyor rollers is mounted, said arm having a pivotal axis which is in the vicinity of the exit of the conveying path, a spring biasing said arm toward a position of rest, and said arm being swingable outwardly from the position of rest against the force of the spring.

7. A device as defined in claim 2 wherein one of the two conveying means is formed by a group of conveyor rollers following one another in the conveying direction, and the other is formed by an edgewise conveyor belt.

8. A device as defined in claim 7 wherein said conveyor belt includes at least one guide pulley, and the first of the conveyor rollers, at the entrance to the conveying path, being offset in the conveying direction in relation to the guide pulley.

9. A device as defined in claim 2 wherein at least one of said conveying means includes a group of conveyor rollers following one another in the conveying direction.

10. A device as defined in claim 9 wherein the speeds of the conveyor rollers increase from the entrance of the conveying path to the exit thereof.

11. A device as defined in claim 4 wherein said channel means includes a bottom conveyor belt.

12. A device as defined in claim 2 wherein the channel means includes two bottom conveyor belts which follow one another in the conveying direction, and the second one having a higher conveying speed than the first.

13. A device as defined in claim 2 wherein the two conveying means are edgewise conveyor belts.

14. A device as defined in claim 13 wherein one of the conveying means includes at least two conveyor belts mounted one above the other with spaces between them, and the conveyor belt at the other side of the channel being mounted at the height of such interspace.

15. A device as defined in claim 2 wherein one of the two conveying means is provided with a surface having a greater entrainment capacity than the other, and the conveying means having the greater entrainment capacity having the higher speed.

References Cited
UNITED STATES PATENTS

| | | | |
|---|---|---|---|
| 1,994,012 | 3/1935 | Broadmeyer | 271—38 |
| 2,578,314 | 12/1951 | Muench | 198—29 |
| 2,679,313 | 5/1954 | Gueffroy | 198—34 |
| 2,941,653 | 6/1960 | Kriemelmeyer | 198—30 X |
| 2,970,537 | 2/1961 | Wardwell | 101—232 |

FOREIGN PATENTS 1,016,644 9/1957 Germany.

EDWARD A. SROKA, *Primary Examiner.*

EVON C. BLUNK, *Examiner.*